United States Patent
Fetvedt et al.

(10) Patent No.: US 11,435,077 B2
(45) Date of Patent: Sep. 6, 2022

(54) SYSTEM AND METHOD FOR COMBUSTION OF NON-GASEOUS FUELS AND DERIVATIVES THEREOF

(71) Applicant: 8 Rivers Capital, LLC, Durham, NC (US)

(72) Inventors: Jeremy Eron Fetvedt, Raleigh, NC (US); Xijia Lu, Durham, NC (US); Brent Gregory, Scottsdale, AZ (US); Chris Bonilha, Phoenix, AZ (US); James Lenertz, Scottsdale, AZ (US); Stefan Tschirren, Laufen (CH); Hassan Abdulsater, Gilbert, AZ (US)

(73) Assignee: 8 Rivers Capital, LLC, Durham, NC (US)

( * ) Notice: Subject to any disclaimer, the term of this patent is extended or adjusted under 35 U.S.C. 154(b) by 11 days.

(21) Appl. No.: 17/087,022

(22) Filed: Nov. 2, 2020

(65) Prior Publication Data

US 2021/0116126 A1   Apr. 22, 2021

Related U.S. Application Data

(62) Division of application No. 15/869,978, filed on Jan. 12, 2018, now Pat. No. 10,859,264.
(Continued)

(51) Int. Cl.
  *F23R 3/12*    (2006.01)
  *F23M 5/08*    (2006.01)
(Continued)

(52) U.S. Cl.
  CPC ............. *F23M 5/085* (2013.01); *F02B 43/12* (2013.01); *F02C 3/22* (2013.01); *F23B 90/06* (2013.01);
(Continued)

(58) Field of Classification Search
  CPC .... F23R 3/002; F23R 3/36; F23R 3/60; F23R 3/286; F23R 3/14; F02C 3/30
  See application file for complete search history.

(56) References Cited

U.S. PATENT DOCUMENTS

| 2,658,332 A | 11/1953 | Nicholson |
| 2,660,521 A | 11/1953 | Teichman |

(Continued)

FOREIGN PATENT DOCUMENTS

| DE | 35 14974 | 10/1986 |
| DE | 3519159 | 12/1986 |

(Continued)

OTHER PUBLICATIONS

Jiang et al., "Experimental Investigation of Flow Resistance and Convection Heat Transfer of CO2 at Supercritical Pressures in a Vertical Porous Tube," *The Journal of Supercritical Fluids*, 2006, vol. 38, pp. 339-346.
(Continued)

*Primary Examiner* — Todd E Manahan
*Assistant Examiner* — Thuyhang N Nguyen
(74) *Attorney, Agent, or Firm* — Womble Bond Dickinson (US) LLP (57) ABSTRACT

The present disclosure relates to apparatuses and methods that are useful for one or more aspects of a power production plant. More particularly, the disclosure relates to combustor apparatuses and methods for a combustor adapted to utilize different fuel mixtures derived from gasification of a solid fuel. Combustion of the different fuel mixtures within the combustor can be facilitated by arranging elements of the combustor controlled so that a defined set of combustion characteristics remains substantially constant across a range of different fuel mixtures.

18 Claims, 6 Drawing Sheets

Related U.S. Application Data (60) Provisional application No. 62/526,022, filed on Jun. 28, 2017, provisional application No. 62/468,183, filed on Mar. 7, 2017.

(51) Int. Cl.

| | | |
|---|---|---|
| *F23G 5/027* | (2006.01) | |
| *F23B 90/06* | (2011.01) | |
| *F23R 3/00* | (2006.01) | |
| *F02B 43/12* | (2006.01) | |
| *F02C 3/22* | (2006.01) | |
| *F23L 7/00* | (2006.01) | |
| *F23D 14/24* | (2006.01) | |
| *F23R 3/06* | (2006.01) | |
| *F23R 3/36* | (2006.01) | |

(52) U.S. Cl.
CPC .............. *F23G 5/027* (2013.01); *F23L 7/007* (2013.01); *F23R 3/002* (2013.01); *F23R 3/12* (2013.01); *F23C 2202/50* (2013.01); *F23D 14/24* (2013.01); *F23D 2214/00* (2013.01); *F23L 2900/07002* (2013.01); *F23R 3/06* (2013.01); *F23R 3/36* (2013.01); *F23R 2900/03041* (2013.01); *F23R 2900/03043* (2013.01); *Y02E 20/12* (2013.01)

(56) References Cited

U.S. PATENT DOCUMENTS

| | | | |
|---|---|---|---|
| 2,861,423 A | 11/1958 | Jerie et al. | |
| 3,399,022 A | 8/1968 | Bailey | |
| 3,420,631 A | 1/1969 | Boyd | |
| 3,623,711 A | 11/1971 | Thorstenson | |
| 3,793,861 A | 2/1974 | Burkhard et al. | |
| 3,857,921 A | 12/1974 | Tamura et al. | |
| 3,921,544 A | 11/1975 | Reese | |
| 3,971,211 A | 7/1976 | Wethe et al. | |
| 3,976,443 A | 8/1976 | Paull et al. | |
| 4,268,765 A | 5/1981 | Hoover | |
| 4,386,941 A | 6/1983 | Crouch et al. | |
| 4,422,925 A | 12/1983 | Williams et al. | |
| 4,483,138 A * | 11/1984 | Willis .................. | F23D 14/24 239/403 |
| 4,572,082 A | 2/1986 | Ueda et al. | |
| 4,667,467 A * | 5/1987 | Archer .................. | F01K 23/067 48/202 |
| 4,673,348 A | 6/1987 | Riley et al. | |
| 4,775,314 A | 10/1988 | Stemling | |
| 4,873,930 A | 10/1989 | Egense et al. | |
| 4,895,710 A | 1/1990 | Hartmann et al. | |
| 4,986,838 A | 1/1991 | Johnsgard | |
| 5,078,760 A | 1/1992 | Haldipur et al. | |
| 5,097,660 A | 3/1992 | Shekleton | |
| 5,116,394 A | 5/1992 | Garkawe | |
| 5,167,932 A | 12/1992 | Ruottu | |
| 5,408,825 A | 4/1995 | Foss et al. | |
| 5,476,375 A | 12/1995 | Khinkis et al. | |
| 5,597,540 A | 1/1997 | Akita et al. | |
| 5,709,077 A | 1/1998 | Beichel | |
| 5,858,065 A | 1/1999 | Li et al. | |
| 5,901,547 A | 5/1999 | Smith et al. | |
| 6,151,887 A | 11/2000 | Haidn et al. | |
| 6,234,787 B1 | 5/2001 | Endoh et al. | |
| RE37,300 E | 7/2001 | Nagato et al. | |
| 6,408,629 B1 | 6/2002 | Harris et al. | |
| 6,436,337 B1 | 8/2002 | Gross | |
| 6,497,118 B1 | 12/2002 | Schermerhorn | |
| 6,596,220 B2 | 7/2003 | Gross | |
| 6,606,851 B1 | 8/2003 | Herdy, Jr. et al. | |
| 6,617,003 B1 | 9/2003 | Lee et al. | |
| 6,843,830 B2 | 1/2005 | Sherer | |
| 6,862,877 B1 | 3/2005 | James | |
| 7,028,478 B2 | 4/2006 | Prentice, III | |
| 7,089,745 B2 | 8/2006 | Roby et al. | |
| 7,093,439 B2 | 8/2006 | Pacheco-Tougas et al. | |
| 7,147,461 B2 | 12/2006 | Neary | |
| 7,186,091 B2 | 3/2007 | Lee et al. | |
| 7,260,935 B2 | 8/2007 | Colibaba-Evulet et al. | |
| 7,334,396 B2 | 2/2008 | Erickson et al. | |
| 7,513,100 B2 * | 4/2009 | Motter .................... | F23L 7/002 60/39.3 |
| 7,516,620 B2 | 4/2009 | Patrick et al. | |
| 7,700,049 B2 | 4/2010 | Clark et al. | |
| 7,736,599 B2 | 6/2010 | Chin et al. | |
| 7,955,406 B2 | 6/2011 | Smith | |
| 8,671,658 B2 | 3/2014 | Prabhu | |
| 8,899,969 B2 | 12/2014 | Gard et al. | |
| 2004/0083737 A1 | 5/2004 | Wright | |
| 2004/0142294 A1 | 7/2004 | Niass et al. | |
| 2004/0219079 A1 | 11/2004 | Hagen et al. | |
| 2005/0135984 A1 | 6/2005 | Ferron et al. | |
| 2005/0225424 A1 | 10/2005 | Tsukada | |
| 2006/0037323 A1 | 2/2006 | Reynolds et al. | |
| 2006/0080966 A1 | 4/2006 | Widener | |
| 2007/0101722 A1 | 5/2007 | Hoffmann | |
| 2007/0234735 A1 | 10/2007 | Mosbacher et al. | |
| 2007/0240425 A1 | 10/2007 | Malavasi et al. | |
| 2007/0274876 A1 | 11/2007 | Chiu et al. | |
| 2008/0250772 A1 | 10/2008 | Becker et al. | |
| 2009/0188256 A1 | 7/2009 | Woodcock et al. | |
| 2009/0255450 A1 | 10/2009 | Stone et al. | |
| 2009/0277180 A1 | 11/2009 | Lam | |
| 2010/0050517 A1 | 3/2010 | Tsilevich | |
| 2010/0083882 A1 | 4/2010 | Widener et al. | |
| 2010/0092280 A1 | 4/2010 | Draper | |
| 2010/0107642 A1 | 5/2010 | Bhaisora et al. | |
| 2010/0242483 A1 | 9/2010 | Snyder et al. | |
| 2010/0300063 A1 | 12/2010 | Palmer et al. | |
| 2010/0307431 A1 | 12/2010 | Buchanan | |
| 2011/0056373 A1 | 3/2011 | Baxter | |
| 2011/0056737 A1 | 3/2011 | Hagiwara et al. | |
| 2011/0067379 A1 | 3/2011 | Khan et al. | |
| 2012/0111012 A1 | 5/2012 | Axelsson et al. | |
| 2012/0131925 A1 | 5/2012 | Mittricker et al. | |
| 2012/0198855 A1 * | 8/2012 | Cihlar .................... | F01D 25/12 60/760 |
| 2012/0247111 A1 * | 10/2012 | Narcus .................. | F23R 3/005 60/752 |
| 2014/0060063 A1 | 3/2014 | Boardman et al. | |
| 2015/0033749 A1 * | 2/2015 | Slobodyanskiy ......... | F23C 9/08 60/772 |
| 2015/0059352 A1 | 3/2015 | Myers | |
| 2015/0118019 A1 * | 4/2015 | Maurer .................. | F01D 25/14 415/1 |
| 2016/0010548 A1 * | 1/2016 | Valeev .................. | F23R 3/283 60/776 |

FOREIGN PATENT DOCUMENTS

| | | |
|---|---|---|
| DE | 4443077 | 6/1996 |
| DE | 4244921 C2 | 2/1998 |
| EP | 0 564 184 | 6/1993 |
| EP | 1 195 559 A2 | 4/2002 |
| EP | 2014 984 | 1/2009 |
| JP | S56124833 | 9/1981 |
| JP | S6373006 | 4/1988 |
| JP | H01111108 | 4/1989 |
| JP | H09145057 | 6/1997 |
| JP | H1054534 | 2/1998 |
| JP | H1082527 | 3/1998 |
| JP | 10-121912 A | 5/1998 |
| JP | H10141662 | 5/1998 |
| JP | H11336528 | 12/1999 |
| JP | 2000291411 | 10/2000 |
| JP | 2001159317 | 6/2001 |
| JP | 200444845 | 2/2004 |
| JP | 201025538 | 2/2010 |
| JP | 2016527439 | 9/2016 |
| RU | 2138661 C1 | 9/1999 |
| SU | 373488 | 5/1973 |
| TW | 200623226 | 7/2006 |

(56) References Cited

FOREIGN PATENT DOCUMENTS

| WO | WO 98/21522    | 5/1998  |
|----|----------------|---------|
| WO | WO 2005/114050 | 12/2005 |
| WO | WO 2008/057685 | 5/2008  |
| WO | WO 2009/007356 | 1/2009  |

OTHER PUBLICATIONS

Sater et al., "A CFD Simulation of Coal Syngas Oxy-Combustion in a High-Pressure Supercritical CO2 Environment," *Proceedings of ASME Turbo Expo 2017: Turbomachinery Technical Conference and Exposition*, Jun. 26-30, 2017, Charlotte, NC, USA, pp. 1-12.

\* cited by examiner

SYSTEM AND METHOD FOR COMBUSTION OF NON-GASEOUS FUELS AND DERIVATIVES THEREOF

CROSS-REFERENCE TO RELATED APPLICATIONS

The present application is a Divisional of U.S. patent application Ser. No. 15/869,978, filed Jan. 12, 2018, which claims priority to U.S. Provisional Patent Application No. 62/468,183, filed Mar. 7, 2017, and U.S. Provisional Patent Application No. 62/526,022, filed Jun. 28, 2017, the disclosures of which are incorporated in their entireties.

GOVERNMENT LICENSE RIGHTS

This invention was made with government support under Contract No. DE-FE0023985 awarded by the U.S. Department of Energy (DOE). The government has certain rights in the invention.

FIELD OF THE DISCLOSURE

The presently disclosed subject matter relates to systems and methods for combustion of non-gaseous fuels, particular in power generation. The systems and methods particularly are useful for accommodating combustion of fuels with variable chemistries.

BACKGROUND

As the world-wide demand for electrical power production increases there is a continuing need for additional power production plants to meet such needs. Because of market demands, it is desirable for such power production to be achieved with the greatest possible efficiency and, to the extent possible, with carbon capture. There remain large reserves of solid fuels, such as coal, that can be utilized for power production, particularly through partial oxidation of the coal to produce a gaseous fuel (i.e., syngas) that can further be combusted. Because of the significant variation in coal compositions, however, it is difficult to provide a syngas source with a reliable and consistent chemistry. As such, there is a need for combustion systems and methods whereby solid fuels can be partially oxidized to provide gaseous fuels that themselves can be combusted for power production without deleterious effects arising from inconsistent chemistries.

SUMMARY OF THE DISCLOSURE

The present disclosure provides systems and methods for power production from solid fuels. More particularly, the present disclosure provides power production systems and methods that can utilize a gaseous fuel that is formed from gasification of a solid fuel. The systems and methods are configured to accommodate differing chemistries in the gaseous fuels arising from variances in the chemistries of the solid fuels that are gasified upstream. This can provide a significant advantage since different, non-gaseous fuels can be switched as needed without the requirement for associated swapping of parts for the power production system combusting the gaseous fuels downstream, all while providing high fuel burnout efficiency and low liner temperature.

In one or more embodiments, the present disclosure can provides power production plants. In exemplary embodiments, a power production plant can comprise: a gasifier configured for receiving a solid fuel and providing a gaseous fuel; a combustor configured for receiving the gaseous fuel, an oxidant, and a diluent, and outputting a combustor exhaust stream; and a turbine configured to receive the combustor exhaust stream; wherein the combustor includes an outer casing and a combustor liner defining a combustion chamber therein, at least a portion of an outer surface of the combustor liner being configured to receive a flow of any one or more of the fuel, the oxidant, and the diluent thereagainst prior to being received by the combustion chamber to thereby provide for cooling of the combustor liner. In further embodiments, the power production plant can be defined in relation to one or more of the following statements, which can be combined in any number or order.

The outer surface of the combustor liner can include a periphery and a length, and substantially the entirety of the outer surface of the combustor liner, about the periphery and along the length thereof, can be configured to receive the flow of any one or more of the fuel, the oxidant, or the diluent thereagainst prior to being received by the combustion chamber.

The combustor liner can comprise a plurality of longitudinally-extending reinforcing rib members engaged with the outer surface of the combustor liner, and at least a portion of the outer surface of the combustor liner between adjacent reinforcing rib members can be configured to receive the flow of any one or more of the fuel, the oxidant, and the diluent thereagainst prior to being received by the combustion chamber.

The power production plant further can comprise a sleeve member extending about the outer surface of the combustor liner and the plurality of reinforcing rib members, the sleeve member cooperating with at least the reinforcing rib members to define a plurality of longitudinally-extending cooling channels about the outer surface of the combustor liner, the flow of any one or more of the fuel, the oxidant, and the diluent being directed through the cooling channels and against the outside surface of the combustion chamber prior to being received by the combustion chamber.

The combustor liner can comprise one or more openings defined therein and adapted for passage therethrough of the oxidant into the combustion chamber.

The combustor liner can comprise one or more openings defined therein and adapted for passage therethrough of the diluent into the combustion chamber.

The combustor liner can comprise a first, inner liner and a second, outer liner.

The inner liner and the outer liner can be spaced apart so as to define a space therebetween, the space being adapted for passage therethrough of the diluent.

The combustion chamber can define a reaction zone and a dilution zone.

The combustor further can comprise an oxidant injector engaging an upstream end of the combustor liner.

The oxidant injector can comprise a first stage oxidant injector arranged to introduce at least a first portion of at least the oxidant into the combustion chamber.

The first stage oxidant injector can include a swirler device configured to direct the oxidant into the combustion chamber at an angle relative to axial.

The swirler device can comprise a plurality of angled oxidant vents configured to direct the oxidant into the combustion chamber at an angle of about 20 degrees to about 85 degrees relative to axial.

The oxidant injector can include a passage therethrough configured for engagement by a fuel nozzle.

The oxidant injector can comprise a second stage oxidant injector arranged to introduce a second portion of at least the oxidant through a wall of the combustor liner defining the combustion chamber.

The second stage oxidant injector can be arranged relative to the first stage oxidant injector so that the second portion of at least the oxidant is introduced through the wall of the combustor liner downstream from the first stage oxidant injector.

In some embodiments, a power production plant can comprise: a gasifier configured for receiving a solid fuel and providing a gaseous fuel; a combustor having a combustor liner defining a combustion chamber configured for receiving the gaseous fuel, an oxidant, and a diluent, and outputting a combustor exhaust stream, the combustion chamber defining a reaction zone and a dilution zone; and an injection arrangement configured to inject at least the oxidant into the combustion chamber of the combustor, the injection arrangement including: a first stage oxidant injector engaging an end of the combustor liner, the first stage oxidant injector being arranged to introduce a first portion of at least the oxidant into the reaction zone of the combustion chamber through a swirler device, the swirler device of the first stage oxidant injector providing for mixing of the oxidant with the fuel, and producing recirculation about the reaction zone; and a second stage oxidant injector arranged to introduce a second portion of at least the oxidant into the reaction zone, through a wall of the combustor liner defining the combustion chamber, downstream of the first stage oxidant injector and prior to the dilution zone of the combustion chamber, the second stage oxidant injector being configured to stabilize a flame produced by combustion and to provide additional mixing of the oxidant with the fuel prior to the dilution zone. In further embodiments, the power production plant can be defined in relation to one or more of the following statements, which can be combined in any number or order.

At least a portion of an outer surface of the combustor liner can be configured to receive a flow of any one or more of the fuel, the oxidant, and the diluent thereagainst prior to being received by the combustion chamber to thereby provide for cooling of the combustor liner.

The combustor liner can comprise a plurality of longitudinally-extending reinforcing rib members engaged with the outer surface of the combustor liner, and at least a portion of the outer surface of the combustor liner between adjacent reinforcing rib members can be configured to receive the flow of any one or more of the fuel, the oxidant, and the diluent thereagainst prior to being received by the combustion chamber.

The combustor liner can comprise one or more openings defined therein and adapted for passage therethrough of the diluent into the combustion chamber.

In one or more embodiments, the present disclosure can relate to power production methods. In exemplary embodiments, a power production method can comprise: gasifying a solid fuel to form a gaseous fuel; injecting the gaseous fuel from the gasifier into a combustor with an oxidant and a diluent so as to combust the fuel and form a combustor exhaust stream; and passing the combustor exhaust stream through a turbine to generate power; wherein the combustor includes an outer casing and a combustor liner defining a combustion chamber therein, and wherein a flow of any one or more of the gaseous fuel, the oxidant, and the diluent is passed along at least a portion of an outer surface of the combustor liner prior to being received by the combustion chamber to thereby provide for cooling of the combustor liner. In further embodiments, the power production methods can be defined in relation to one or more of the following statements, which can be combined in any number or order.

The combustor liner can comprise a plurality of longitudinally-extending reinforcing rib members engaged with the outer surface of the combustor liner, and the flow of any one or more of the fuel, the oxidant, can be passed along at least a portion of the outer surface of the combustor liner between adjacent reinforcing rib members prior to being received by the combustion chamber.

The combustor liner can comprise one or more openings defined therein, and at least a portion of the oxidant can be passed through the one or more openings into the combustion chamber.

The combustor liner can comprise one or more openings defined therein, and wherein at least a portion of the diluent can be passed through the one or more openings into the combustion chamber.

The power production method can comprise passing at least a portion of the oxidant into the combustion chamber through an oxidant injector engaging an upstream end of the combustor liner.

The power production method can comprise passing a portion of the oxidant into the combustion chamber through a first stage oxidant injector that includes a swirler device that directs the oxidant into the combustion chamber at an angle of about 20 degrees to about 85 degrees relative to axial.

The power production method can comprise passing the gaseous fuel into the combustion chamber through a fuel nozzle that is engaging a passage through the oxidant injector.

The power production method can comprise passing a portion of the oxidant into the combustion chamber through a second stage oxidant injector passing through a wall of the combustor liner defining the combustion chamber.

In further embodiments, the present systems and methods can incorporate the use of a combustor apparatus having a defined configuration. In exemplary embodiments, such combustor can have a combustion chamber configured to receive a fuel, an oxidant, and a diluent, the combustor being adapted to combust different compositions of the fuel within the combustion chamber and to direct resulting combustion products from the combustion chamber into an inlet end of an exhaust nozzle and through the exhaust nozzle to an outlet end thereof, at least a portion of an outer surface of the exhaust nozzle being configured to receive a flow of at least the oxidant thereagainst to thereby provide for cooling of the exhaust nozzle.

In some embodiments, the outer surface of the exhaust nozzle can at least partially define a helical channel extending from the outlet end to the inlet end of the exhaust nozzle, the helical channel being configured to receive at least the oxidant at the outlet end and to direct the oxidant toward the inlet end.

In some embodiments, the outer surface of the exhaust nozzle can at least partially define a helical channel extending from the inlet end to the outlet end of the exhaust nozzle, the helical channel being configured to receive at least the oxidant at the inlet end and to direct the oxidant toward the outlet end.

In some embodiments, the outer surface of the exhaust nozzle can at least partially define a helical channel having a first helical portion extending from the outlet end to the inlet end, and a second helical portion in fluid communication with the first helical portion and extending from the inlet end to the outlet end of the exhaust nozzle, the first helical portion being configured to receive at least the oxidant at the outlet end and to direct the at least the oxidant toward the inlet end and the second helical portion being configured to receive the at least the oxidant from the first helical portion at the inlet end and to direct the at least the oxidant toward the outlet end.

In some embodiments, such combustor apparatus can have a combustion chamber configured to receive a fuel, an oxidant, and a diluent. The combustor can be adapted to combust different compositions of the fuel. The combustion chamber can define a combustion zone and a recirculation zone. An injection arrangement can be configured to inject at least the oxidant into the combustion chamber of the combustor. The injection arrangement can include a first stage arranged to introduce a first portion of at least the oxidant into a primary zone of the combustion chamber through a swirler device. The swirler device of the first stage can provide for mixing of the oxidant with the fuel, and produce a recirculation zone within the primary zone about a center axis of the combustion chamber to induce a flame-stabilizing vortex breakdown and to enhance mixing. A second stage can be arranged to introduce a second portion of at least the oxidant into the recirculation zone, through a wall of a combustor liner defining the combustion chamber, downstream of the primary zone and prior to a dilution zone thereof. The second stage can be configured to stabilize a flame produced by combustion and to provide additional mixing of the oxidant with the fuel prior to the dilution zone.

These and other features, aspects, and advantages of the present disclosure will be apparent from a reading of the following detailed description together with the accompanying drawings, which are briefly described below. The present disclosure includes any combination of two, three, four, or more of the above-noted aspects as well as combinations of any two, three, four, or more features or elements set forth in this disclosure, regardless of whether such features or elements are expressly combined in a specific embodiment description herein. This disclosure is intended to be read holistically such that any separable features or elements of the present disclosure, in any of its various aspects and embodiments, should be viewed as intended to be combinable unless the context clearly dictates otherwise. Aspects of the present disclosure thus provide advantages as otherwise detailed herein.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods adapted for power production utilizing solid fuels such as coal. The solid fuels specifically can be partially oxidized to provide a gaseous fuel, such as synthesis gas (or syngas) that is combusted in a power production plant and process. As such, in some embodiments, the disclosure encompasses coal syngas oxy-combustion in a high pressure supercritical $CO_2$ environment. The present disclosure therefore encompasses systems and methods wherein coal and another solid hydrocarbon feedstock material can be partially oxidized into a syngas, which can then be fed into a combustor in the oxy-combustion system and method.

In one or more embodiments, a solid fuel can be partially oxidized to provide a gaseous fuel that is itself combusted in a power production plant and process. As such, as used herein, reference to a "gaseous fuel," "fuel gas," or the like is understood to reference a fuel in gas form that is directly derived from the partial oxidation of a solid fuel—e.g, gasification of a solid fuel. The term "syngas" in particular is understood to mean a gas of variable chemistry arising from the partial oxidation of coal. For example, coal and/or another solid feedstock material can partially oxidized in a gasifier to produce high temperature raw syngas, which can contain varying combinations of $H_2$, CO, $CH_4$, $CO_2$, $H_2S$, and other minor species. Likewise, other solid fuels can be partially oxidized to provide a gaseous fuel. The raw syngas can be further processed, for example, by cooling and cleaning to remove ash, soluble acid(s), water, and heavy metal(s). Sulfur species can be removed by existing acid gas removal process or stay in the syngas for combustion. Existing gasifiers, including entrained flow gasifiers, fluidized bed gasifiers, and moving bed gasifiers can be used for gasification of various coal feedstock or other solid feedstock materials. The cleaned coal syngas chemistry varies by different coal feedstock, different gasifiers, different coal feeding systems, and different syngas cleanup procedures.

The properties of a syngas fuel, including combustion properties, can differ significantly based upon the actual chemistry of the syngas fuel. For example, syngas fuels that are rich in hydrogen and methane will exhibit fuel properties from syngas fuels that are rich in carbon monoxide. The heating value of syngas is strongly impacted by the $CO_2$ content in the syngas, and this can differ significantly depending upon the type of coal gasifier that is utilized to produce the syngas. For example, syngas produced from slurry fed gasifiers can have a $CO_2$ content in excess of 20% by mass, while syngas produced from dry fed gasifiers can typically have a $CO_2$ content of less than 10% by mass. Therefore, for a given mass of each fuel, properties such as flame characteristics, thermal energy delivered to the downstream system temperature profiles, exhaust gas conditions, and exhaust gas compositions can vary significantly.

Since a combustor for a power production facility must be designed as a fixed chamber, only a narrow range of fuel mixtures can be matched with the combustor design conditions (and therefore flame and combustor outlet conditions) and thus be tolerable for use in the combustor. Further, mixtures within this range may still cause perturbations in combustor or flame behavior that must be tightly controlled. The present disclosure thus is beneficial in that it can achieve power production utilizing coal or another solid fuel as the initial fuel source by providing partial oxidation followed by combustion of the produced syngas in a combustor that is configured to accommodate the varying chemistries of the produced syngas.

The present disclosure thus can relate to power production plants and processes including a variety of elements. Non-limiting examples of elements that may be included in power production plants and processes according to the present disclosure are described in U.S. Pat. Nos. 8,776,532, 9,581,082, and U.S. Pat. Pub. No. 2017/0241338, the disclosures of which are incorporated herein by reference.

Figure 1:
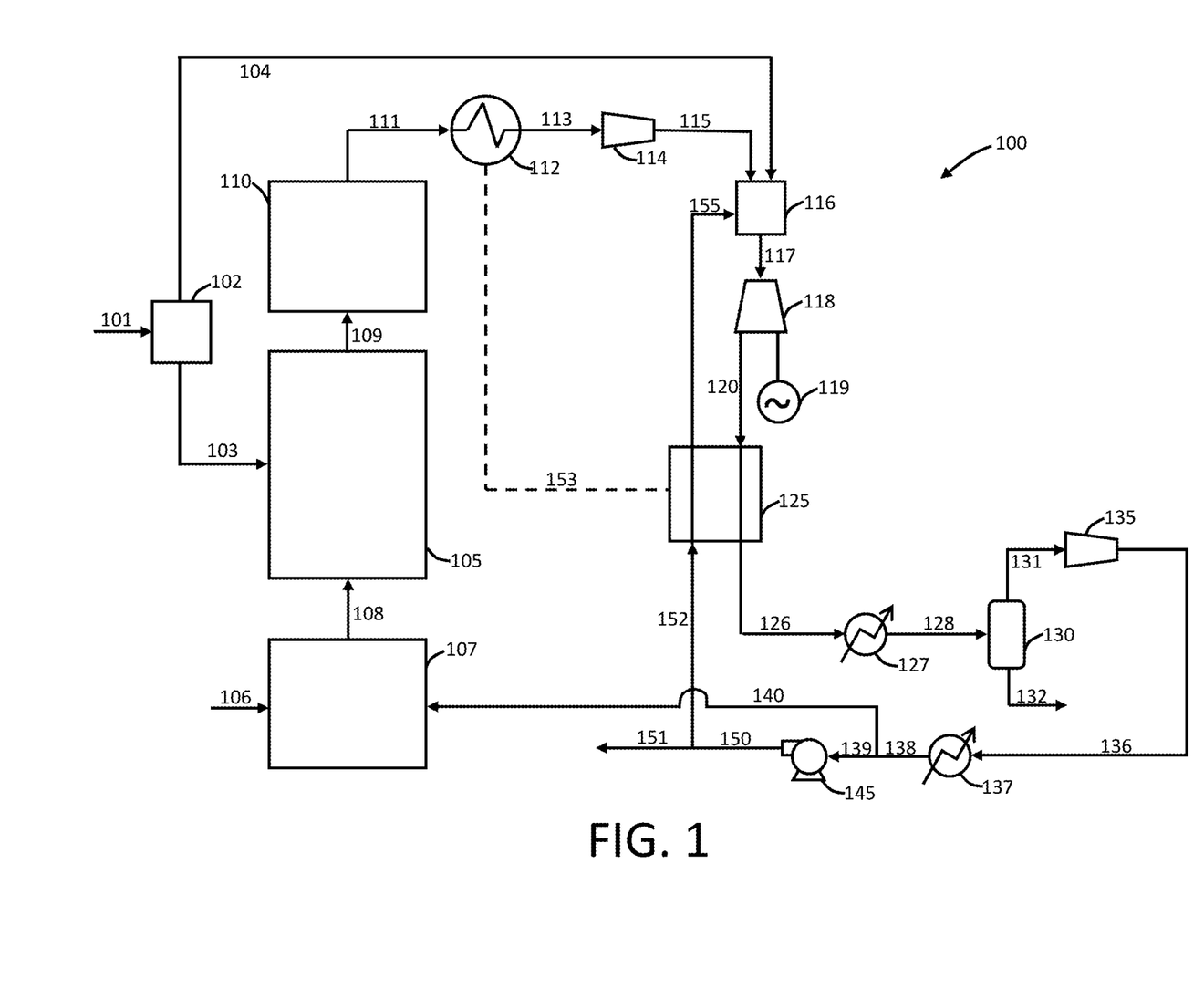
FIG. 1 is an illustration of a power production plant useful for carrying out a power product method according to exemplary embodiments of the present disclosure.

A power production plant and methods of operation thereof are further described herein in relation to FIG. 1. As seen therein, the power production plant 100 includes elements suitable for partial oxidation of a solid fuel, such as coal, to form a gaseous fuel that is combusted in a combustor that is configured for continuous operation even when fuels of differing chemistries are utilized. As such, it is possible to utilize solid fuels of different grades that result in formation of gaseous fuels with varying chemistries without need for changing the combustor.

Referencing FIG. 1, in exemplary embodiments, a power production plant 100 can include an air source 101 that provides air into an air separation unit (ASU) 102 to form a stream of substantially pure oxygen in line 103 and line 104. Although not illustrated, it is understood that the ASU 102 may include a variety of compressors and/or pumps configured to provide the oxygen in lines 103 and 104 at increased pressures (which may differ or be substantially the same). If desired, however, additional compressors and/or pumps may be provided in line 103 and/or line 104 to provide the desired level of compression. The oxygen in line 103 is directed to a gasifier 105, which can be a single gasifier or a plurality of gasifiers, and any suitable type of gasifier as otherwise noted herein may be utilized. Solid fuel from solid fuel source 106 can be provided to a prep station 107 where, for example, the solid fuel may be ground with one or more grinders to provide a particularized solid fuel of the desired average particle size. In the prep station 107, the solid fuel may be entrained in a fluidizing medium, such as substantially pure carbon dioxide (although other fluidizing media may be used in addition or in the alternative). The solid fuel prepared in the prep station 107 is passed through line 108 to the gasifier 105 and exits in line 109 as a partially oxidized, gaseous fuel. For example, when the solid fuel is coal, a synthesis gas ("syngas") of varying chemistries may be provided through line 109. The gaseous fuel in line 109 is passed through a scrubbing unit 110, which unit can include one or more elements for removing particulates and other non-fuel components of present in the gaseous fuel. The cleaned gaseous fuel is passed in line 111 to a heat exchanger 112, which can be used to provide low grade heating as otherwise described herein. The cooled gaseous fuel exits the heat exchanger in line 113, is compressed in the gaseous fuel compressor 114, and is delivered through line 115 to a combustor 116.

The gaseous fuel from line 115 is combusted in the combustor 116 with the oxygen from line 104, which optionally may be diluted with a diluent, such as an inert gas, carbon dioxide, or water. Preferably, recycle carbon dioxide in line 155 is also input to the combustor 116. The combustor exhaust stream exits the combustor 116 in line 117 and is expanded in a turbine 118 to generate power with generator 119. The turbine exhaust in line 120 is passed through a heat exchanger 125 where it is cooled and exits in line 126 before passage through a cooler 127 that provides the exhaust stream through line 128 at near ambient temperature to a water separator 130. Water exits the separator 130 in line 132, and the water stream may further include solubilized impurities, such as $H_2SO_4$ and $HNO_3$. Substantially pure carbon dioxide exits the separator 130 in line 131, is compressed in compressor 135, passes through line 136 to cooler 137 to increase the density of the carbon dioxide, and exits in line 138. A portion of the carbon dioxide in line 138 can be passed through line 140 to the solid fuel prep station 107 (e.g., to be used as a fluidizing medium). The remainder of the high density carbon dioxide passes in line 139 to pump 145 where it is pumped to a pressure suitable for input to the combustor 116 and exits as line 150. A portion of the high pressure carbon dioxide in line 150 may be exported from the power production plant 100 in line 151. The remaining portion of the substantially pure, high pressure, recycle carbon dioxide from line 150 is directed through line 152 through the heat exchanger 125 to be re-heated against the turbine exhaust in line 120. The heated, recycle carbon dioxide passes in line 155 to the combustor 116.

Figure 2:
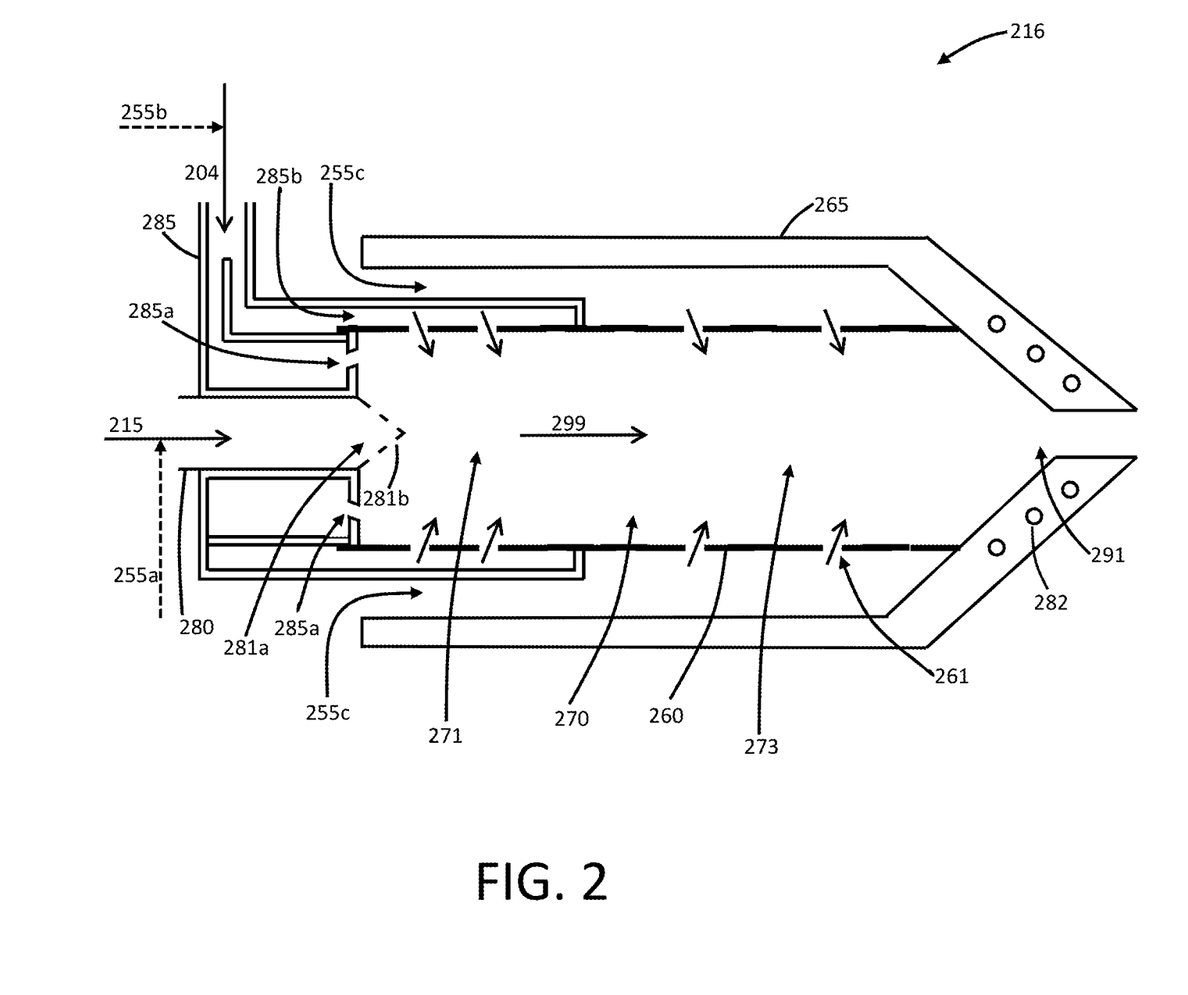
FIG. 2 is a partial cross-sectional view of a combustor useful in a power production plant and power production method according to exemplary embodiments of the present disclosure.

In one or more embodiments, the present disclosure particularly provides a combustor (116, 216) that can be configured for combusting a gaseous fuel that is subject to varying chemistries arising from formation of the gaseous fuel through partial oxidation of a solid fuel. As such, the combustor (116, 216) can have a combustion chamber 270 configured to receive a fuel, an oxidant, and a diluent, directly, indirectly, or both directly and indirectly. For example, the fuel, the oxidant, and the diluent can be received into the combustion chamber 270 directly via an injection mechanism or a diffusion mechanism. For example, the fuel, the oxidant, and the diluent can be received into the combustion chamber 270 indirectly by way of a mixing arrangement, wherein the fuel, the oxidant, and the diluent are pre-mixed prior to being introduced into the combustion chamber 270.

Referring to FIG. 2, the combustion chamber 270 of the combustor 216 can be defined by a combustor liner 260 that is surrounded by an outer casing 265. The outer casing 265 can include one or more cooling elements, such as cooling orifices 282, though which a cooling fluid may be circulated. In some embodiments, the cooling fluid may be the same material as used for the diluent as further discussed herein. At least a portion of an outer surface of the combustor liner 260 can be configured to receive a flow of any one or more of the fuel, the oxidant, and the diluent thereagainst prior to any one or more of the fuel, the oxidant, or the diluent being directed into the combustion chamber 270 to thereby provide for cooling of the combustor liner. In some embodiments, the outer surface of the combustor liner 260 can include a periphery and a length, and substantially the entirety of the outer surface of the combustor liner, about the periphery and along the length thereof, can be configured to receive the flow of any one or more of the fuel, the oxidant, or the diluent thereagainst prior to any one or more of the fuel, the oxidant, or the diluent being directed into the combustion chamber 270.

Backside wall cooling or outer wall surface cooling can be beneficial, in some embodiments, to keep operational temperatures of the combustor liner 260 below a particular threshold. This can be achieved in some instances by flowing supercritical carbon dioxide ("$sCO_2$"), oxidant, and/or fuel flow along a length of the combustor liner prior to supplying the $sCO_2$, oxidant and/or fuel to the combustor. High pressure $sCO_2$ has a high specific heat value, which may reduce the amount of $sCO_2$ required for the effectively cooling the combustor liner 260 compared to other types of cooling gases.

In addition to the foregoing (or in the alternative), the $sCO_2$ cooling the combustor liner 260 can be subsequently directed ("recycled") to other processes associated with the power system implementing such a combustor. In this manner, energy loss through the combustor wall and/or liner can be reduced, and the combustion cycle efficiency can be improved.

In the exemplary embodiments illustrated in FIG. 2, the combustor liner 260 includes a plurality of perforations 261 so that injected fluid flowing along the outer periphery of the combustor liner may pass therethrough into the combustion chamber 270. The combustion chamber 270 can be divided into a reaction zone 271 and a dilution zone 273. The reaction zone (RZ) 271 can be the portion of the combustion chamber 270 proximate the fuel nozzle 280—i.e., at the front, or upstream portion of the combustion chamber. The dilution zone (DZ) 273 can be proximate the exit 291 of the combustion chamber 270—i.e., at the end or downstream portion of the combustion chamber. In some embodiments, the reaction zone 271 and the dilution zone 273 can each encompass approximately half of the total volume of the combustion chamber 270. A volume ratio (RZ/DZ) of the combustion chamber 270 encompassed by the reaction zone 271 relative to the dilution zone 273 can be about 0.1 to about 5, about 0.25 to about 4, about 0.5 to about 2, or about 0.75 to about 1.5.

For combustion, fuel gas enters in line 215 to pass through the fuel nozzle 280 into the combustion chamber 270, and particularly the reaction zone 271. The fuel gas in line 215 can be diluted through addition of diluent through line 255*a*. The diluent may be, for example, an inert gas, carbon dioxide, water, or a mixture thereof. The fuel nozzle 280 can include a cone 281*a* with a plurality of perforations 281*b*. The perforations 281*b* in the cone 281*a* can be aligned at a defined angle from the axial (e.g., about 15 degrees to about 80 degrees, about 20 degrees to about 70 degrees, about 25 degrees to about 60 degrees, or about 30 degrees to about 50 degrees from the axial) to distribute the fuel through the reaction zone 271 as the fuel mixes with the oxidizer and burns. Oxidant in line 204 enters the oxidant injector 285, which includes a first stage oxidant injector 285*a* and a second stage oxidant injector 285*b*. Oxidant in the first stage oxidant injector 285*a* can enter the combustion chamber 270 substantially co-linear with the fuel gas entering through the fuel nozzle 280. As further described below, the first stage oxidant injector 285*a* can be substantially configured to impart a defined directional flow to the oxidant, such as providing a swirling flow within the combustion chamber 270, particularly within the reaction zone 271. Although two openings are illustrated in FIG. 2 defining the first stage oxidant injector 285*a*, it is understood that the first stage oxidant injector 285*a* may substantially surround the fuel nozzle 280 and thus define a plurality of openings for oxidant injection—e.g., at least 2, at least 3, at least 4, at least 5, at least 6, or even more openings (such as 2 to 20, 3 to 16, or 4 to 12 openings). The second stage oxidant injector 285*b* can comprise one or more perforations or other portals configured through the combustor liner 260. As such, the oxidant can pass around a portion of the outer periphery of the combustor liner 260, particularly around a portion of the outer periphery of the combustor liner that is at least partially defining the reaction zone 271 within the combustion chamber 270. Oxidant entering the combustion chamber 270 through the second stage oxidant injector 285*b* can be injected substantially perpendicularly to the flow of the oxidant entering through the first stage oxidant injector 285*a*. Again, although four openings are illustrated in FIG. 2 defining the second stage oxidant injector 285*b*, it is understood that the second stage oxidant injector 285*b* may substantially surround the a portion of the combustor chamber 270 and thus define a plurality of openings for oxidant injection through the combustor liner 260—e.g., at least 2, at least 3, at least 4, at least 5, at least 6, or even more openings (such as 2 to 20, 3 to 16, or 4 to 12 openings). The openings defining the second stage oxidant injector 285*b* may be longitudinally spaced along a portion of the combustor liner 260 as illustrated. In some embodiments, the openings defining the second stage oxidant injector 285*b* may be aligned in a single row around the outer periphery of the combustor liner 260 or may be aligned in a plurality of rows around the outer periphery of the combustor liner. The oxidant in line 204 can be diluted through addition of diluent through line 255*b*. The diluent may be, for example, an inert gas, carbon dioxide, water, or a mixture thereof. At the inlet to the combustion chamber 270, the combustor liner 260 fits over the oxidant injector 285 to provide radial support while also allowing for axial, thermal growth. The periphery of the combustor liner 260 is configured to manage the cooling flow used for cooling the liner and managing the second stage oxidizer supply.

A diluent stream 255*c* may be passed directly into the combustion chamber 270 through the combustor liner 260 in one or more embodiments. The diluent stream 255*c* thus may be injected around at least a portion of the outer periphery of the combustor liner 260 for passage through the perforations 261 or other openings into the combustion chamber 270. The diluent stream 255*c* can particularly be injected into the dilution zone 273.

Figure 3A:
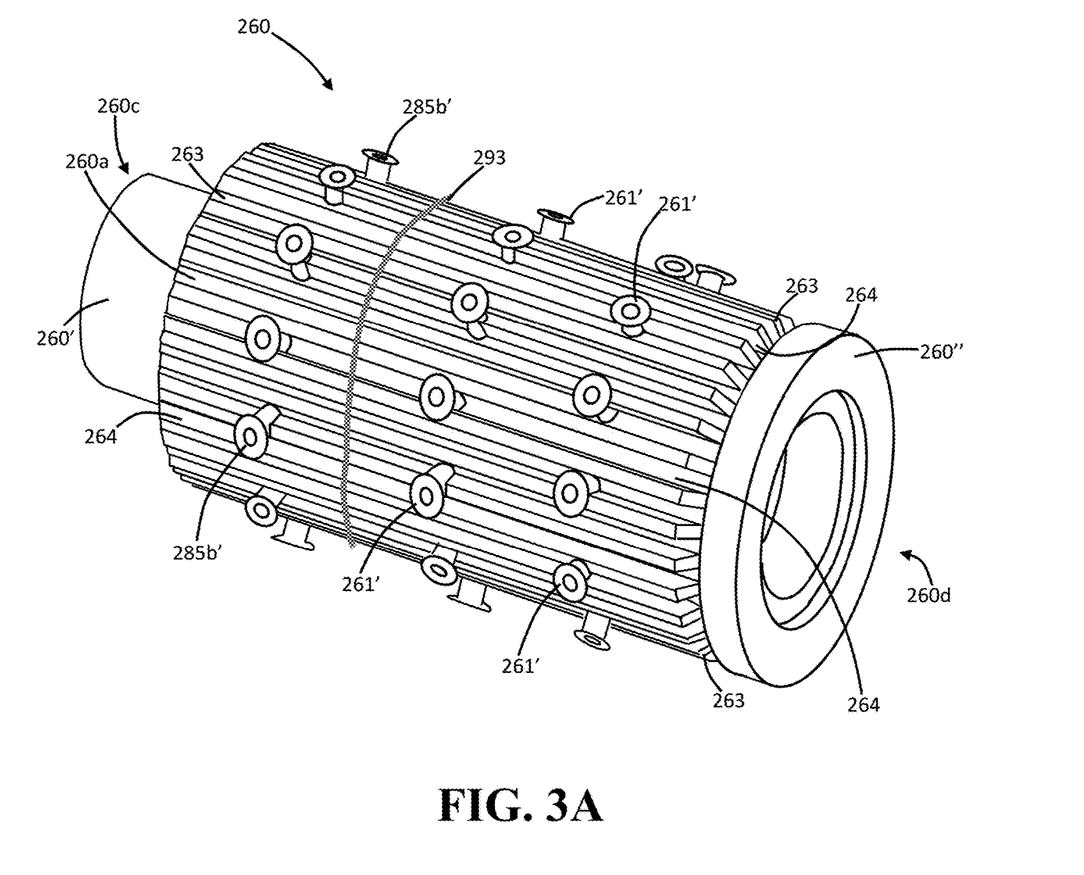
FIG. 3A is a perspective illustration of a combustor liner useful in a power production plant and power production method according to exemplary embodiments of the present disclosure.
Figure 3B:
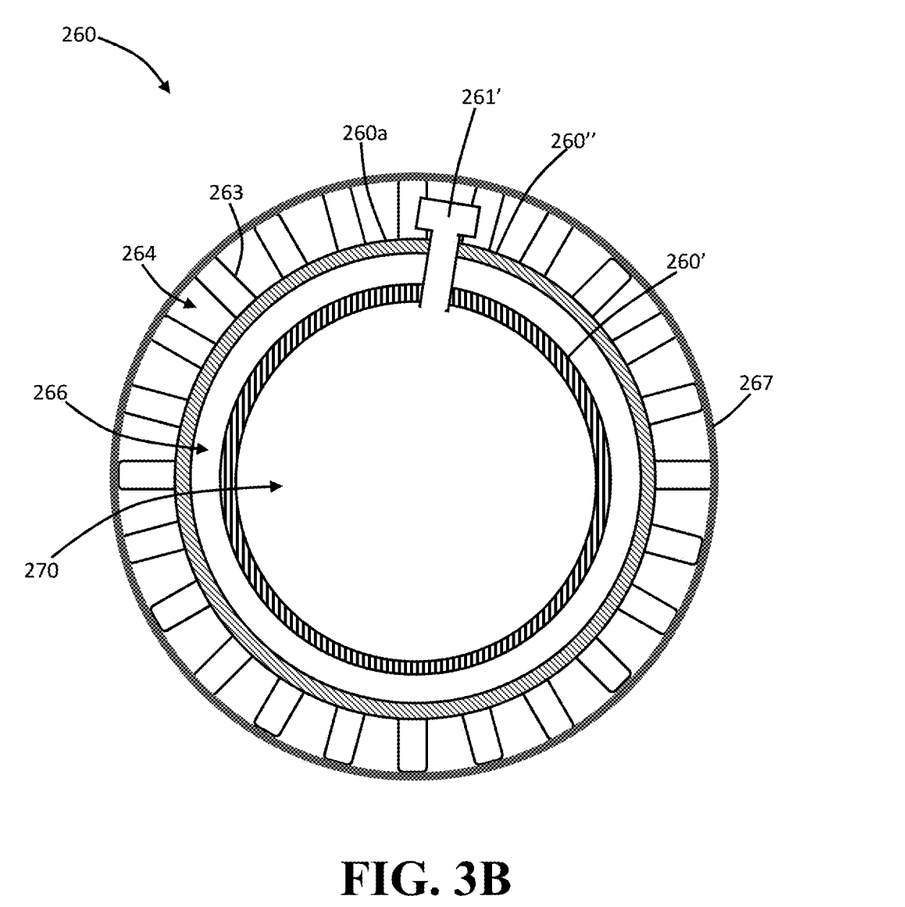
FIG. 3B is a partial cross-sectional view of a combustor liner useful in a power production plant and power production method according to exemplary embodiments of the present disclosure.
Figure 4:
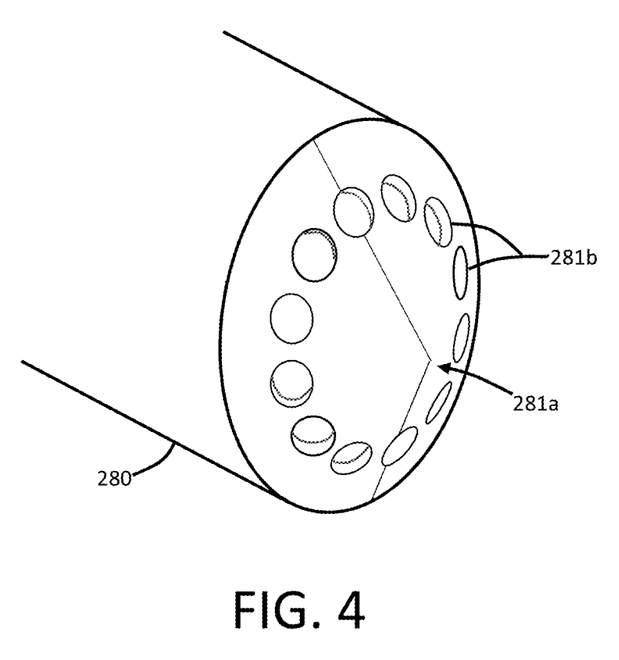
FIG. 4 is a partial perspective illustration of a fuel nozzle useful in a power production plant and power production method according to exemplary embodiments of the present disclosure.
Figure 5:
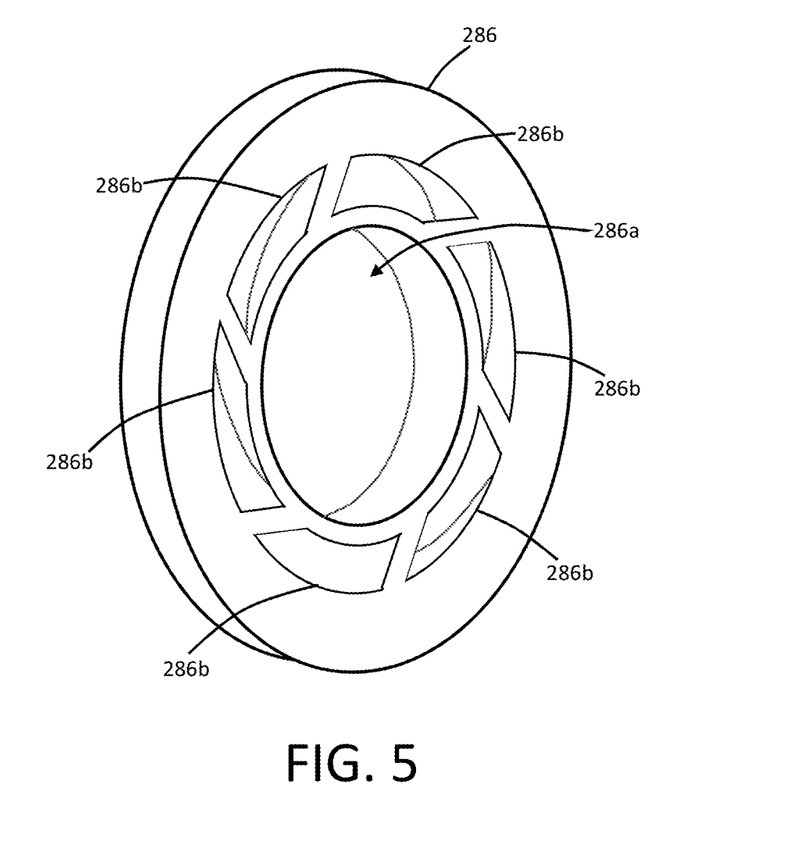
FIG. 5 is a partial perspective illustration of a swirler device useful in a power production plant and power production method according to exemplary embodiments of the present disclosure.

The combustor liner 260 is further illustrated in FIG. 3*a* and FIG. 3*b*. In one or more embodiments, the combustor liner 260 can be configured to include a plurality of longitudinally-extending reinforcing members engaged with the outer surface of the combustor liner, wherein at least a portion of the outer surface of the combustor liner between adjacent reinforcing members is configured to receive a flow of any one or more of the fuel, the oxidant, or the diluent thereagainst prior to any one or more of the fuel, the oxidant, or the diluent being directed into the combustion chamber. As illustrated, the outer surface 260*a* of the combustor liner 260 includes a plurality of ribs 263 extending outward from the outer surface of the combustor liner, and a plurality of cooling channels 264 are defined by adjacent ribs and the outer surface of the combustor liner. At least a portion of the second stage oxidant injector 285*b* can be defined in the combustor liner 260 in the form of a plurality of oxidant ports 285*b'* that extend outward from the combustor liner. The oxidant for injection through the second stage oxidant injector 285*b* can thus flow along at least a portion of the combustor liner 260 in the channels 264 between the ribs 263 to provide for backside cooling of the combustor liner prior to injection into the combustion chamber 270. As illustrated, the oxidant ports 285b' forming the second stage oxidant injector 285b are radially aligned around the outer periphery of the combustor liner 260 in a single array. It is understood, however, that different alignments are also encompassed. For example, a plurality of arrays may be utilized. Moreover, a random spacing may be utilized.

In addition to the foregoing, a plurality of diluent ports 261' may be included in the combustor liner 260, the diluent ports extending outward from the outer surface 260a of the combustor liner. The diluent ports 261' are positioned downstream relative to the oxidant ports 285b'. As such, the oxidant ports 285b' may be substantially positionally aligned with the reaction zone 271 within the combustion chamber 270, and the diluent ports 261' may be substantially positionally aligned with the dilution zone 273 of the combustion chamber. The diluent for injection into the combustion chamber 270 can thus flow along at least a portion of the combustor liner 260 in the channels 264 between the ribs 263 to provide for backside cooling of the combustor liner prior to injection into the combustion chamber. As illustrated, the diluent ports 261' are radially aligned around the outer periphery of the combustor liner 260 in a plurality arrays. It is understood, however, that different alignments are also encompassed. For example, a single array or a greater number of arrays may be utilized. Moreover, a random spacing may be utilized.

The combustor liner 260 and/or the outer casing 265 of the combustor 216 may include additional structural elements as needed. For example, in order to separate the cooling flows provided by the oxidant and the diluent along the outer periphery of the combustor liner 260, a separating wall 293 may be included between the oxidant ports 285b' and the diluent ports 261' so that only oxidant may flow along the upstream portion of the combustor liner 261 and only diluent may flow along the downstream portion of the combustor liner 261. In some embodiments, the combustor line can comprise a plurality of layers. For example, as seen in FIG. 3a, a first, inner layer 260' of the combustor liner 260 extends outward from the upstream end 260c of the combustor liner. The first layer 260' thus may engage the oxidant injector 285 as otherwise described herein. Oxidant may be passed along the outer periphery of the combustor liner 260 for passage into the oxidant port 285b'. Diluent may be passed in a space 266 between the first layer 260' and a second, outer layer 260". The ribs 263 and channels 264 may thus be defined in the second, outer layer 260" of the combustor liner 260. The diluent may exit the downstream end 260d of the combustor liner 260 and circulate outward to the outer periphery of the combustor line to flow back and into the diluent ports 261'.

In yet further embodiments, as seen in FIG. 3b, a sleeve member 267 can extend about the outer surface of the combustor liner 260 and the plurality of reinforcing ribs 263. The sleeve member 267 can cooperate with at least the ribs 263 to define the plurality of longitudinally-extending cooling channels 264 about the outer surface of the combustion chamber 270. The flow of any one or more of the fuel, the oxidant, or the diluent can be directed through the cooling channels 264 and against the outside surface 260a of the combustor liner 260 prior to any one or more of the fuel, the oxidant, or the diluent being directed into the combustion chamber 270. In some embodiments, supercritical carbon dioxide (sCO$_2$) may particularly be used as the diluent that is directed to flow along the channels. This sCO$_2$ cooling flow along the channels provides, for example, backside or outer surface convective cooling of the combustor liner, which facilitates maintaining the combustor liner below material temperature limitations.

In operation, the same fuel nozzle 280 and oxidant injector 285 can be utilized with varying fuel chemistries by adjusting the oxidant to diluent ratio and/or the fuel to diluent ratio. This can be achieved by varying the ratios in the injected streams and/or by varying the amount of diluent that is added directly to the combustion chamber 270 in the diluent stream 255c. The combustion reaction can be completed in a substantially uniform temperature range (e.g., about 1,200° C. to about 3,000° C., about 1,400° C. to about 2,800° C., or about 1,600° C. to about 2,400° C.) in the reaction zone to form a combustor exhaust stream 299 that is cooled in the dilution zone 273 to a near uniform temperature range (e.g., about 600° C. to about 1,500° C., about 800° C. to about 1,400° C., or about 900° C. to about 1,200° C.). The combustor 216 is preferably sized to accommodate the required heat release rate, flow rates, and residence times to produce well mixed turbine inlet flows with complete combustion, the combustor exhaust comprising being carbon dioxide rich.

In one or more embodiments, the first stage oxidant injector 285a can be configured to introduce a first portion of the oxidant from line 204 (optionally include diluent from line 255b) into the reaction zone 271 of the combustion chamber 270 through a swirler device. In an exemplary embodiments illustrated in FIG. 2, a swirl plate 286 can be included with the oxidant injector 285 and preferably is positioned at the outlet of the oxidant injector into the combustion chamber 270. The swirl plate 286 can comprise a central orifice 286a through which the fuel nozzle 280 may extend. As such, the central orifice 286a can have in internal diameter that is substantially identical to an external diameter of the fuel nozzle 280, although the relative dimensions may vary as needed to accommodate additional components, such as a sealing arrangement that may be provided between the fuel nozzle and the swirl plate as desired. The swirl plate 286 further includes a plurality of oxidant vents 286b—i.e., openings in the swirl plate to allow flow of oxidant from the oxidant injector 285 to pass therethrough. As illustrated, by including the swirl plate 286, the first stage oxidant injector 285a may substantially surround the fuel nozzle 280 and thus define a plurality of openings for oxidant injection—e.g., at least 2, at least 3, at least 4, at least 5, at least 6, or even more openings (such as 2 to 20, 3 to 16, or 4 to 12 openings). The oxidant vents 286b in the swirl plate 286 preferably are angularly aligned to direct the oxidant into the combustion chamber 270 at an angle relative to axial. In some embodiments, the angular alignment can be configured to produce a desired swirl number. For example, the oxidant vents 286b can be angularly aligned to direct oxidizer into the combustion chamber at an angle relative to axial that is in the range of about 20 degrees to about 85 degrees, about 30 degrees to about 80 degrees, about 40 degrees to about 75 degrees, or about 50 degrees to about 70 degrees. The angular alignment can be configured to provide an effective swirl number of about 1 to about 10, about 1.1 to about 5, or about 1.2 to about 2.

The swirler device utilized in the first stage oxidant injector 285a preferably is configured to provide for mixing of the oxidant with the fuel so as to produce recirculation within the reaction zone 271 about a center axis to induce a flame-stabilizing vortex breakdown and to enhance mixing. The second stage oxidant injector 285b can be configured to introduce a second portion of the oxidant (optionally including diluent) into the combustion chamber 270 through the combustor liner 260. The injection of the oxidant through the second stage oxidant injector 285b preferably is provided downstream of the first stage oxidant injector 285a but still positioned to introduce the oxidant into the reaction zone 271 of the combustion chamber 270 (i.e., upstream from the dilution zone 273). The second stage oxidant injector 285b can be configured to stabilize a flame produced by combustion and provide additional mixing of the oxidant with the fuel upstream from the dilution zone 273. The mass flow of the oxidant (optionally including a diluent) through the first stage oxidant injector 285a and the second stage oxidant injector 285b can vary and may be adjustable in response to changes in the fuel chemistry. The mass flow ratio of the first stage oxidant injector 285a to the second stage oxidant injector 285b can be about 0.1 to about 8, about 0.25 to about 5, about 0.5 to about 2, or about 0.75 to about 1.5. The mass ratio of the first stage oxidant injector 285a to the second stage oxidant injector 285b can be tuned to provide efficient fuel/oxidant mixing and a complete fuel burnout of the fuel, oxidant, and diluent fuel mixture.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A power production plant comprising:
a gasifier configured for receiving a solid fuel and providing a gaseous fuel;
a combustor configured for receiving the gaseous fuel, an oxidant, and a diluent, and outputting a combustor exhaust stream; and
a turbine configured to receive the combustor exhaust stream;
wherein:
the combustor includes an outer casing and a combustor liner defining a combustion chamber therein, the combustor liner comprising a plurality of longitudinally-extending reinforcing rib members engaged with an outer surface of the combustor liner and extending toward the outer casing, wherein adjacent rib members and the outer surface of the combustor liner define a plurality of cooling channels along the outer surface of the combustor liner, the plurality of cooling channels being configured to receive a flow of any one or more of the fuel, the oxidant, and the diluent thereagainst prior to being received by the combustion chamber to thereby provide for cooling of the combustor liner;
the combustor liner comprises one or more openings defined therein and adapted for passage therethrough of the oxidant into the combustion chamber;
the combustor liner comprises one or more openings defined therein and adapted for passage therethrough of the diluent into the combustion chamber; and
the combustor includes a wall comprising a longitudinally extending portion, the longitudinal extending portion of the wall positioned between the combustor liner and the outer casing, the wall being effective to allow only oxidant to flow along an upstream portion of the combustor liner and allow only diluent to flow along a downstream portion of the combustor liner.

2. The power production plant of claim 1, further comprising a sleeve member extending about the outer surface of the combustor liner and the plurality of reinforcing rib members, the sleeve member cooperating with at least the reinforcing rib members to define a plurality of longitudinally-extending cooling channels about the outer surface of the combustor liner, the flow of any one or more of the fuel, the oxidant, and the diluent being directed through the cooling channels and against the outside surface of the combustion chamber prior to being received by the combustion chamber.

3. The power production plant of claim 1, wherein the combustor liner comprises a first, inner liner and a second, outer liner.

4. The power production plant of claim 3, wherein the inner liner and the outer liner are spaced apart so as to define a space therebetween, the space being adapted for passage therethrough of the diluent.

5. The power production plant of claim 1, wherein the combustion chamber defines a reaction zone and a dilution zone.

6. The power production plant of claim 1, wherein the combustor further comprises an oxidant injector engaging an upstream end of the combustor liner.

7. The power production plant of claim 6, wherein the oxidant injector comprises a first stage oxidant injector arranged to introduce at least a first portion of at least the oxidant into the combustion chamber.

8. The power production plant of claim 7, wherein the first stage oxidant injector includes a swirler device configured to direct the oxidant into the combustion chamber at an angle relative to axial.

9. The power production plant of claim 8, wherein the swirler device comprises a plurality of angled oxidant vents configured to direct the oxidant into the combustion chamber at an angle of 20 degrees to 85 degrees relative to axial.

10. The power production plant of claim 7, wherein the oxidant injector comprises a second stage oxidant injector arranged to introduce a second portion of at least the oxidant through a wall of the combustor liner defining the combustion chamber.

11. The power production plant of claim 10, wherein the second stage oxidant injector is arranged relative to the first stage oxidant injector so that the second portion of at least the oxidant is introduced through the wall of the combustor liner downstream from the first stage oxidant injector.

12. The power production plant of claim 6, wherein the oxidant injector includes a passage therethrough configured for engagement by a fuel nozzle.

13. A power production method comprising:
gasifying a solid fuel to form a gaseous fuel;
injecting the gaseous fuel from the gasifier into a combustor with an oxidant and a diluent so as to combust the fuel and form a combustor exhaust stream; and
passing the combustor exhaust stream through a turbine to generate power;
wherein the combustor includes an outer casing and a combustor liner defining a combustion chamber therein having a reaction zone and a dilution, and wherein the following conditions are met:
a first portion of at least the oxidant is introduced into the reaction zone of the combustion chamber through a swirler device;
a second portion of at least the oxidant is introduced into the reaction zone of the combustion chamber through a wall of the combustor liner downstream from the introduction of the first portion of at least the oxidant and upstream from the dilution zone of the combustion chamber;

at least a portion of the diluent is introduced into the dilution zone of the combustion chamber through the wall of the combustor liner;

the second portion of at least the oxidant is passed along only an upstream portion of the combustor liner prior to being introduced into the reaction zone through the wall of the combustor liner; and the at least a portion of the diluent is passed along only a downstream portion of the combustor liner prior to being introduced into the dilution zone through the wall of the combustor liner.

14. The power production method of claim 13, wherein the combustor liner comprises a plurality of longitudinally-extending reinforcing rib members engaged with an outer surface of the combustor liner, and wherein any one or more of the fuel, the oxidant, and the diluent is passed along at least a portion of the outer surface of the combustor liner between adjacent reinforcing rib members prior to being received by the combustion chamber.

15. The power production method of claim 13, wherein the combustor liner comprises one or more openings defined therein, and wherein at least a portion of the oxidant is passed through the one or more openings into the combustion chamber.

16. The power production method of claim 13, wherein the combustor liner comprises one or more openings defined therein, and wherein at least a portion of the diluent is passed through the one or more openings into the combustion chamber.

17. The power production method of claim 13, wherein the swirler device is effective to direct the oxidant into the combustion chamber at an angle of 20 degrees to 85 degrees relative to axial.

18. The power production method of claim 13, comprising passing the gaseous fuel into the combustion chamber through a fuel nozzle that is engaging a passage through the oxidant injector.

* * * * *